TRANSCEIVER FOR TWO-WAY COMMUNICATION
Filed July 20, 1946
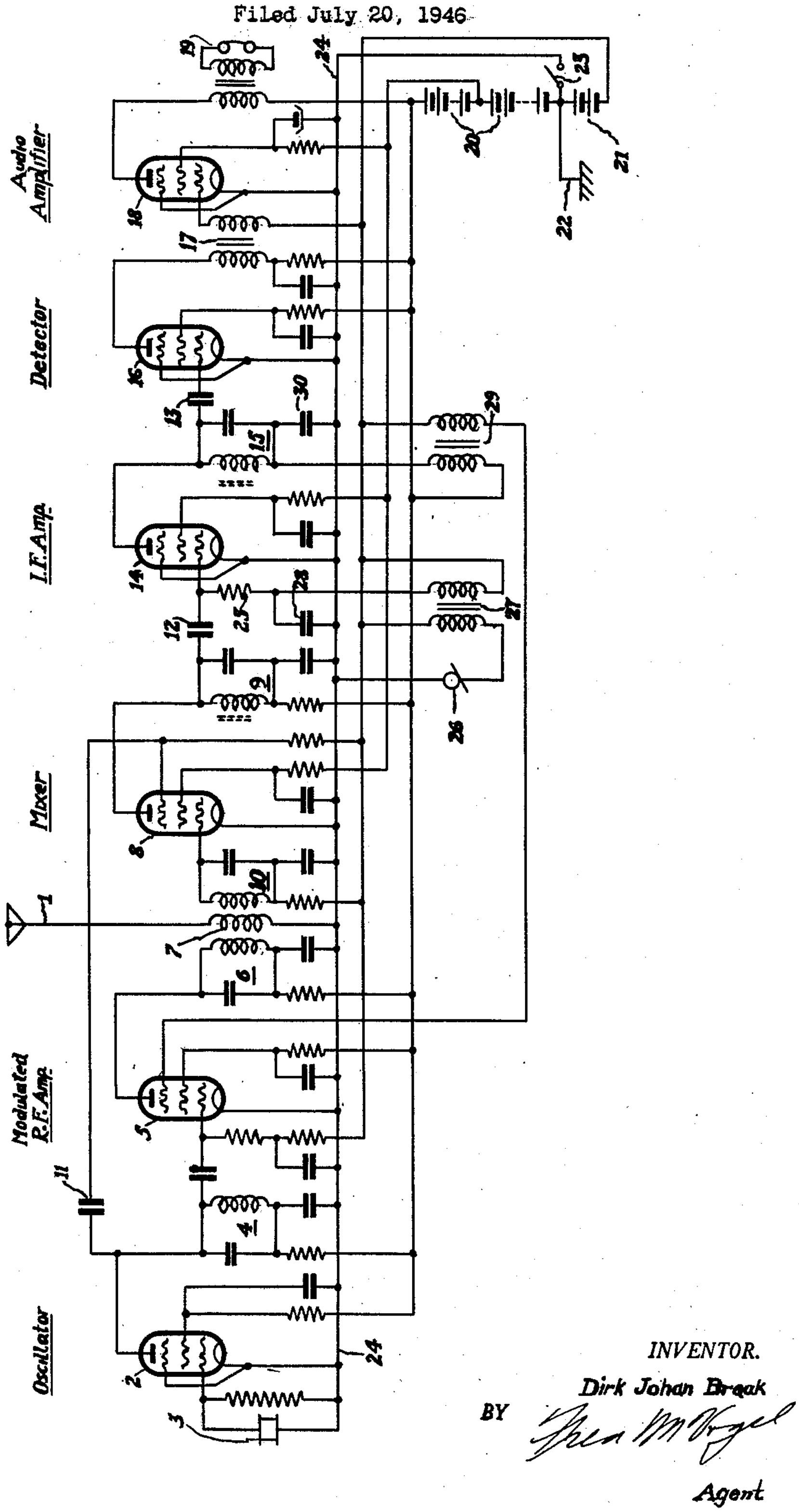
INVENTOR.
Dirk Johan Braak
BY [signature]
Agent Patented June 20, 1950

2,512,300

UNITED STATES PATENT OFFICE 2,512,300

TRANSCEIVER FOR TWO-WAY COMMUNICATION

Dirk Johan Braak, Eindhoven, Netherlands, assignor to Hartford National Bank and Trust Company, Hartford, Conn., as trustee Application July 20, 1946, Serial No. 685,134
In the Netherlands September 10, 1943

Section 1, Public Law 690, August 8, 1946
Patent expires September 10, 1963

3 Claims. (Cl. 250—13)

This invention relates to a transceiver which is arranged for reciprocal communication.

In such apparatus, in which while it is in use both the transmitter and the receiver must constantly be ready for use in such a manner that while listening-in to a counter-station the latter may be interrupted directly, it has been proposed before, in order to economise an amplifying tube, to use a low-frequency amplifier stage of the receiver also for the amplification of the speech oscillations to be transmitted obtained from the microphone. In doing this a so-called microphone-relay must be used which connects particularly the output side of the said low-frequency tube substantially without delay to the modulator of the transmitter when speech oscillations occur.

Naturally, the microphone-relay used may not respond to the demodulated oscillations received and the relay energized by oscillations originating from the microphone may otherwise not fall off on account of the normal interval of speech between two words or the like. This arrangement results in that the adjustment of the microphone-relay in the known devices is particularly detrimental with regard to responsive sensitiveness period of energisation and deenergisation.

According to the invention, these difficulties can be obviated by using in transceivers for reciprocal communication a high- or intermediate-frequency amplifying tube of the receiver rather than a low-frequency tube for the amplification of the modulating oscillations to be transmitted.

Thus the modulating oscillations to be transmitted, occurring at the same tube and the oscillations received not yet demodulated can be separated according to their frequencies, for example, in the manner customary with radio receivers having a reflex circuit-arrangement.

If the tuning frequency of the receiver corresponds with the transmitting frequency, it is necessary, during the transmission, in order to prevent so-called sound circulation "singing about," either to interrupt the reception cascade or to reduce materially the sensitiveness of the receiver. For this purpose use may be made of a relay which is included in the output circuit of the high- or intermediate-frequency receiver tube which also serves for the amplification of the modulating oscillations and which responds to low-frequency oscillations but does not respond to high-frequency oscillations. A separation according to the frequencies of the various oscillations is thus required in contradistinction to the device assumed to be known, in which the modulating and the demodulated oscillations received had to be separated according to their amplitudes. The above mentioned difficulties involved by the use of a microphone relay are thus avoided by the use of the invention.

Any change of connections in the transmitter or receiver and consequently a microphone relay may be omitted completely if a transceiver comprising a superheterodyne receiving circuit-arrangement is used, in which, as is known per se, the transmitting frequency corresponds with the local oscillator frequency of the receiver.

In order that the invention may be clearly understood and readily carried into effect, it will now be explained more fully with reference to one form of construction, given by way of example, of a transceiver of the last-mentioned type according to the invention.

The single figure of the drawing shows the circuit-diagram of a transceiver which is arranged for reciprocal communication and constructed to be portable and which, in view thereof, is supplied from batteries, all the amplifying tubes used being of the same type.

The transmitter portion of the device is shown to the left, the receiver portion to the right of the aerial 1.

The transmitter portion comprises an oscillator tube 2 having a crystal 3 which determines the oscillation frequency and is included in the grid circuit. The anode circuit 4 of this tube is tuned to the crystal frequency. The oscillations generated are fed to the control grid of an amplifying tube 5 connected as a suppressor grid-modulator. The modulator tube also forms the output amplifier of the transmitter portion from whose tuned output circuit 6 are obtained through an aerial coil 7 located in the aerial circuit 1 the modulated oscillations to be transmitted. The low-frequency oscillations fed to the suppressor grid of the modulator 5 originate from a microphone amplifier which will be described after the receiver portion of the device to be described hereinafter.

The input stage of the superheterodyne receiver is constituted by a mixing tube 8 and an intermediate-frequency circuit 9 included in the anode circuit. The oscillations received are fed to the control grid of the mixing tube 8 through the aerial coil 7 and an input circuit 10, whereas the suppressor grid of this tube is capacitatively coupled (11) with the output circuit 4 of the transmitter oscillator 2, 3, 4 used at the same time as a local oscillator for the receiver. In connection therewith, the tuning frequency of the receiver and hence the natural frequency of the receiver input circuit 10 differs from the transmitter frequency by an amount corresponding with the intermediate frequency of the receiver.

The oscillations set up in the intermediate-frequency circuit 9 are fed via blocking condenser 12 of a low value (for example 50 pfs.) and an intermediate-frequency amplification stage 14 having an output circuit 15 via a second blocking condenser 13 of low value to an amplifying tube 16 acting as a detector which is connected to the output amplifying tube 18 of the receiver through a transformer 17, a headphone 19 being connected to the tube.

The anode and screen-grid voltages and also the required negative control- and suppressor grid biases are taken from an anode battery 20 and a grid bias battery 21 respectively and, so far as necessary, supplied to the electrodes concerned via decoupling resistances and condensers. The interconnected terminals of the batteries 20, 21 are earthed (22) and are connected to the earth-conductor 24 of the circuit arrangement through a switch 23 used for the switching-on of all supply voltages.

According to the invention, a high or intermediate-frequency amplifying tube of the receiving cascade, to wit in the form of construction shown by way of example the intermediate-frequency amplifying tube 14, also serves for the amplification of the modulating oscillations to be transmitted. To this end the control grid of the tube 14 has supplied to it in addition to the intermediate-frequency oscillations obtained from the circuit 9 also, through a grid resistance 25 of, say 0.5 megohm, the speech oscillations set up in the secondary winding of a transformer 27 connected to a microphone 26. The secondary winding of the transformer 27 is shunted for the intermediate frequency by a decoupling condenser 28 of, say, 200 pfs. The output circuit of the tube 14 comprises the series combination of the said intermediate-frequency circuit 15 and the input winding of a low-frequency transformer 29 whose secondary winding is included in the suppressor grid circuit of the modulator tube 5 of the transmitter and thus supplies the amplified modulating oscillations. As before, in a manner as known with radio receivers having a reflex circuit-arrangement, the transformer is shunted for the intermediate frequency by a decoupling condenser 30.

The transceiver illustrated operates as follows.

If, by means of the switch 23, the supply voltages are switched on, both the receiver and the transmitter portions of the device are completely ready for use.

Oscillations received from a counter-station, whose carrier wave frequency must correspond with the tuning frequency of the receiver, are mixed in the mixing tube 8 with the locally generated oscillations 2. The intermediate-frequency oscillations thus set up are fed to the headphone 19 after being amplified (14) detected (16) and subjected to low frequency amplification (18).

The transmitter portion meanwhile operative is in no manner whatsoever affected by the oscillations received, because owing to the decoupling (30) of the transformer 29 included in the suppressor grid circuit of the modulator 5 intermediate frequency oscillations cannot find their way into the suppressor grid circuit and otherwise low-frequency oscillations are not set up in the anode circuit of the intermediate-frequency amplifying tube 14 on account of the oscillations received.

Thus, solely its own unmodulated carrier wave occurs in the output circuit 6 of the tranmitter portion. This wave is transmitted, either through the aerial coil 7 or direct to the receiver input circuit 11 but this is not harmful in any respect because the local oscillator frequency and one's own carrier wave frequency are identical and hence, even if the difference between the carrier wave frequency and the tuning frequency of the receiver in connection with the selectivity of the input circuit of the receiver does not suffice to prevent absolutely the occurrence of oscillations corresponding with one's own carrier wave at the control grid of the mixing tube 8 this will not be a source of trouble during reception.

When listening to the transmission of a counter-station, it may be interrupted at any moment by speaking in the microphone 26 but without previously performing any particular manipulations. The speech oscillations are transmitted by the microphone transformer 27 to the control grid of the intermediate-frequency tube 14 and, after amplification they occur in the anode circuit of this tube. The impedance of the intermediate-frequency circuit 15 included in the anode circuit is practically negligible for low-frequency oscillations, so that the amplified speech oscillations occur without being weakened in the input winding of the transformer 29 and via the latter reach the suppressor grid of the modulator tube 5 and bring about the modulation of the carrier wave to be transmitted.

One's own modulated carrier wave finding its way into the control grid of the mixing tube 8 as the case may be via the aerial coil 7 and the input circuit 10 may, in conjunction with the carrier wave of the counter-station, which differs from it by an amount corresponding with the intermediate frequency of the receiver, result in that the oscillations taken from the microphone 26 become audible in the headphone 19 simultaneously with the modulation of the counter-station. This enables a simple supervision of one's own transmission and is not otherwise troublesome at all, because one's own speech oscillations which thus have become audible are not louder than those of the counter-station.

Instead of an intermediate frequency tube 14, the mixing tube 8 or else any high-frequency pre-amplifying stage present may, of course, be used to constitute the microphone amplifier.

Lastly, it may be observed that, if desired, a microphone relay controlled by the oscillations obtained from the microphone 26 and included, for example, in the anode circuit of the tube 14 may be used in the present case for disconnecting the headphone or for another method of suitably interrupting the receiver cascade during the time the transmitter portion of the device is utilized for the transmission of modulated oscillations.

What I claim is:

1. Transceiver apparatus for simultaneously transmitting and receiving radio signals by means of a single antenna comprising a transmitter to supply high frequency oscillations to said antenna and including a radio frequency oscillator and a radio frequency amplifier coupled to the output of said oscillator and having modulation means, a source of modulation voltage, a receiver arranged to derive incoming radio signals from said antenna and including a detector for deriving the modulation component from said incoming radio signals, an intermediate-frequency amplifier stage preceding said detector and a mixer stage preceding said intermediate frequency stage for heterodyning the incoming signals with local oscillations to shift said incoming signals to said intermediate-frequency, means to apply the intermediate-frequency signals and said modulation voltage as a common input to said intermediate-frequency stage to amplify concurrently said intermediate-frequency signals and the modulated voltage, means to separate in the output of said intermediate-frequency amplifier the amplified modulation voltage from the amplified intermediate-frequency signals, and means to apply said amplified modulation voltage to the modulation means of said transmitter, the operating frequency of said transmitter corresponding to the frequency of said local oscillations.

2. An arrangement as set forth in claim 1 further including means to derive the local oscillations for the mixer stage of said receiver from the radio frequency oscillator in said transmitter.

3. An arrangement as set forth in claim 1 wherein said intermediate-frequency amplifier includes an electron discharge tube having a cathode, a grid and an anode, an input intermediate-frequency resonant circuit coupled between grid and cathode of said tube, means to apply a modulation voltage on the grid of said tube, an output intermediate-frequency resonant circuit, a modulation transformer having a primary and a secondary, means to impress a positive voltage on the anode of said tube through the primary of said transformer in series with said output resonant circuit, and a capacitor connected between cathode and the junction of said output resonant circuit and said primary for bypassing intermediate-frequencies.

DIRK JOHAN BRAAK.

REFERENCES CITED

The following references are of record in the file of this patent:

UNITED STATES PATENTS

| Number | Name | Date |
|---|---|---|
| 1,784,150 | Loftin | Dec. 9, 1930 |
| 2,058,512 | Rust et al. | Oct. 27, 1936 |
| 2,213,398 | Kirchner | Sept. 3, 1940 |
| 2,281,982 | Leyn | May 5, 1942 |
| 2,289,444 | Mayr | July 14, 1942 |
| 2,297,482 | Kuhlmann | Sept. 29, 1942 |
| 2,327,248 | Case | Aug. 17, 1943 |